(12) United States Patent
Curfman et al.

(10) Patent No.: US 10,343,380 B2
(45) Date of Patent: Jul. 9, 2019

(54) TRIM COMPONENT FOR A VEHICLE INTERIOR

(71) Applicant: UFP Technologies, Inc., Georgetown, MA (US)

(72) Inventors: Gregory E. Curfman, Jackson, MI (US); Denis Gerard Raczak, Bruce Township, MI (US); Victor A. Plath, Nunica, MI (US)

(73) Assignee: UFP Technologies, Inc., Georgetown, MA (US)

( * ) Notice: Subject to any disclaimer, the term of this patent is extended or adjusted under 35 U.S.C. 154(b) by 217 days.

(21) Appl. No.: 15/611,303

(22) Filed: Jun. 1, 2017

(65) Prior Publication Data

US 2017/0348951 A1    Dec. 7, 2017

Related U.S. Application Data

(60) Provisional application No. 62/343,947, filed on Jun. 1, 2016.

(51) Int. Cl.
*B32B 3/12* (2006.01)
*B32B 7/12* (2006.01)
(Continued)

(52) U.S. Cl.
CPC ............... *B32B 27/10* (2013.01); *B32B 3/12* (2013.01); *B32B 7/12* (2013.01); *B32B 27/20* (2013.01);
(Continued)

(58) Field of Classification Search
CPC ......... B32B 27/10; B32B 27/20; B32B 27/32; B32B 7/12; B32B 3/12; B32B 2307/54;
(Continued)

(56) References Cited

U.S. PATENT DOCUMENTS 3,635,483 A * 1/1972 Barriball .................. A63C 5/12
273/DIG. 4
6,569,509 B1   5/2003 Alts
(Continued)

FOREIGN PATENT DOCUMENTS

DE        41 31 394 C2    12/1996
DE        196 27 106 A1    3/1997
(Continued)

OTHER PUBLICATIONS

Advance Packaging Technologies product catalog, 2016.*
(Continued)

*Primary Examiner* — Shane Fang
(74) *Attorney, Agent, or Firm* — Howard & Howard Attorneys PLLC

(57) ABSTRACT

A trim component for a vehicle interior includes first and second skin layers, a core layer sandwiched between the first and second skin layers with the core layer having first and second sides, a first thermoplastic adhesive material including a polyamide disposed between the first skin layer and the core layer to adhere the first skin layer to the first side of the core layer, and a second thermoplastic adhesive material including a polyamide disposed between the second skin layer and the core layer to adhere the second skin layer to the second side of the core layer.

19 Claims, 3 Drawing Sheets

(51) Int. Cl.
- B32B 27/10 (2006.01)
- B32B 27/20 (2006.01)
- B32B 27/32 (2006.01)
- B60R 13/01 (2006.01)

(52) U.S. Cl.
CPC ............ *B32B 27/32* (2013.01); *B60R 13/011* (2013.01); *B32B 2262/101* (2013.01); *B32B 2307/54* (2013.01); *B32B 2605/003* (2013.01)

(58) Field of Classification Search
CPC ........ B32B 2605/003; B32B 2262/101; B60R 13/011
See application file for complete search history.

(56) References Cited

U.S. PATENT DOCUMENTS

| | | | |
|---|---|---|---|
| 6,586,072 B1 | 7/2003 | Renault | |
| 2006/0080941 A1* | 4/2006 | Ishii | E04C 2/3405 52/782.1 |
| 2006/0083892 A1* | 4/2006 | Wang | B32B 3/12 428/72 |
| 2007/0054087 A1* | 3/2007 | Smith | B32B 3/12 428/116 |
| 2012/0007377 A1* | 1/2012 | Buchheit | B60R 13/0815 296/1.08 |
| 2017/0050408 A1* | 2/2017 | Park | B29C 44/02 |

FOREIGN PATENT DOCUMENTS

| | | |
|---|---|---|
| DE | 197 02 581 A1 | 8/1997 |
| DE | 102 55 039 A1 | 6/2004 |
| DE | 103 10 368 A1 | 10/2004 |
| DE | 103 17 670 A1 | 10/2004 |
| EP | 1 045 775 B1 | 9/2002 |
| JP | 2009-073401 A | 4/2009 |
| WO | WO 99/61284 A1 | 12/1999 |
| WO | WO 01/92086 A1 | 12/2001 |

OTHER PUBLICATIONS

Axxor product catalog, 2016.*
SymaLite product catalog, 2016.*
Advance Packaging Technologies, "APT 9B9B", Jun. 1, 2004, 1 page.
ASTM International, "Designation: C297/C297M—15—Standard Test Method for Flatwise Tensile Strength of Sandwich Constructions", Sep. 29, 2015, pp. 1-8.
Axxor, "Axxor Core Version 5.2 Product Specification Sheet", Dec. 6, 2015, 1 page.
Composites World, "Tough Sandwich Design Lightens Load Floor in Crossover SUV", downloaded from www.compositesworld.com/articles on Feb. 23, 2016, 2 pages.
Gemini Group, "ValleyEnterprises—Interior Trim—Baypreg", downloaded from http://geminigroup.net/baypreg.html on Feb. 23, 2016, 1 page.
Osio, Ignacio G. et al., "Attachment Strategies for Baypreg F-Sandwich Composites", 2004, pp. 1-9.
English language abstract and machine-assisted English translation for DE 41 31 394 extracted from espacenet.com database on Jun. 19, 2017, 14 pages.
English language abstract and machine-assisted English translation for DE 196 27 106 extracted from espacenet.com database on Jun. 19, 2017, 12 pages.
English language abstract and machine-assisted English translation for DE 197 02 581 extracted from espacenet.com database on Jun. 19, 2017, 10 pages.
English language abstract and machine-assisted English translation for DE 102 55 039 extracted from espacenet.com database on Jun. 19, 2017, 13 pages.
English language abstract and machine-assisted English translation for DE 103 10 368 extracted from espacenet.com database on Jun. 19, 2017, 9 pages.
English language abstract and machine-assisted English translation for DE 103 17 670 extracted from espacenet.com database on Jun. 19, 2017, 13 pages.
English language abstract for EP 1 045 775 extracted from espacenet.com database on Jun. 19, 2017, 1 page.
English language abstract and machine-assisted English translation for JP 2009-073401 extracted from espacenet.com database on Jun. 19, 2017, 15 pages.
English language abstract for WO 99/61284 extracted from espacenet.com database on Jun. 19, 2017, 1 page.

* cited by examiner

TRIM COMPONENT FOR A VEHICLE INTERIOR

CROSS REFERENCE TO RELATED APPLICATIONS

The subject application claims priority to and all the benefits of U.S. Provisional Application No. 62/343,947, filed on Jun. 1, 2016, the contents of which are expressly incorporated herein in their entirety.

FIELD OF THE DISCLOSURE

The present disclosure relates generally to a trim component for a vehicle interior.

BACKGROUND

Load floors are often disposed within a cargo, luggage, or other similar area within a vehicle. The load floor is typically constructed from lightweight materials, and should be strong enough to support a load. However, many load floors still tend to break or crack when exposed to heavy loads. Accordingly, there remains an opportunity to provide a trim component for a cargo area of a vehicle, such as a load floor, that is lightweight and can withstand heavy loads without breaking or cracking.

SUMMARY

An embodiment of a trim component for a vehicle interior comprises a first skin layer, a second skin layer, a core layer sandwiched between the first and second skin layers with the core layer having first and second sides, a first thermoplastic adhesive material including a polyamide disposed between the first skin layer and the core layer to adhere the first skin layer to the first side of the core layer, and a second thermoplastic adhesive material including a polyamide disposed between the second skin layer and the core layer to adhere the second skin layer to the second side of the core layer.

Another embodiment of a trim component for a vehicle interior comprises a first skin layer formed from a blend of glass fibers and a thermoplastic material, a second skin layer formed from a blend of glass fibers and a thermoplastic material, a core layer sandwiched between the first and second skin layers with the core layer having a honeycomb structure with first and second sides, a first thermoplastic adhesive material including a polyamide disposed between the first skin layer and the core layer to adhere the first skin layer to the first side of the core layer, and a second thermoplastic adhesive material including a polyamide disposed between the second skin layer and the core layer to adhere the second skin layer to the second side of the core layer.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION

Figure 1:
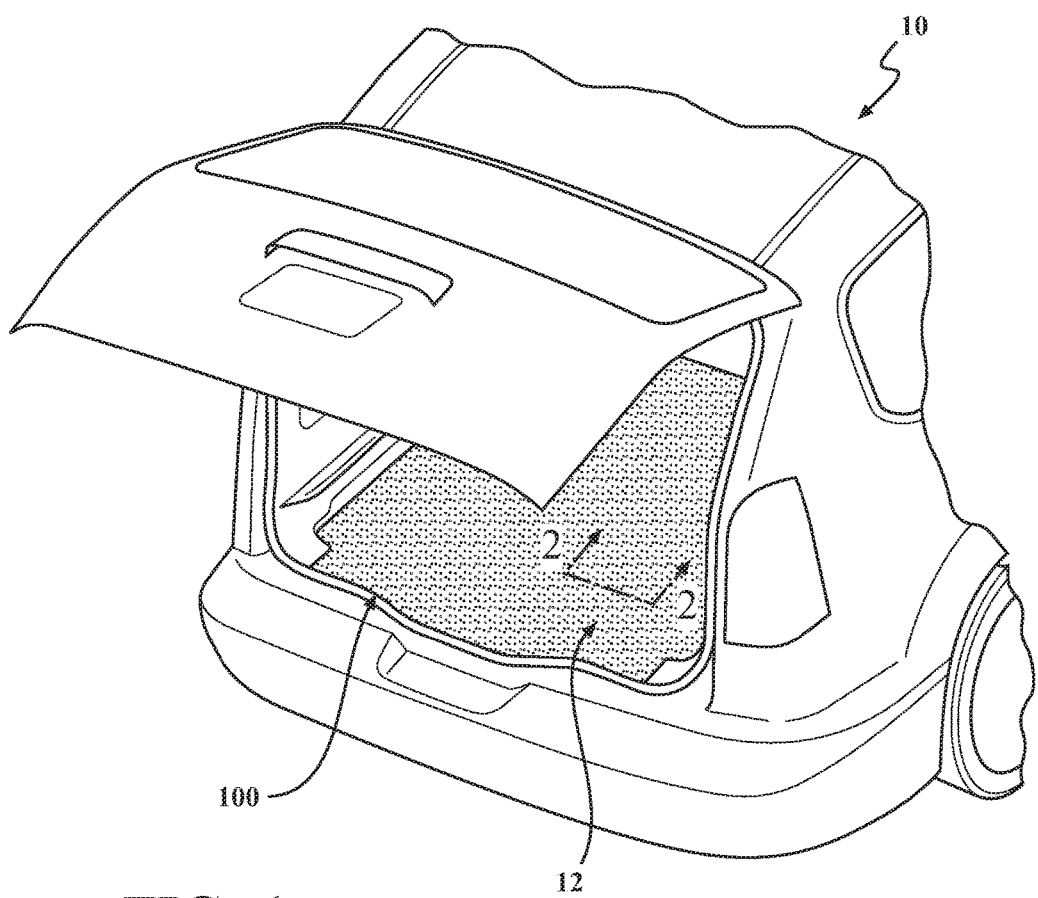
FIG. 1 is a perspective view of a portion of a vehicle having a vehicle interior with a trim component disposed within the vehicle interior, according to an embodiment of the present disclosure.

Referring now to the figures, wherein like numerals indicate corresponding parts throughout the several views, embodiments of a trim component 100 are shown in the figures and are described in detail below. In the illustrated embodiments, the trim component 100 is a load bearing surface, such as a load floor for a vehicle interior that is capable of bearing a load without damaging the structure of the component. For example, FIG. 1 illustrates a portion of a vehicle 10 having a cargo area 12, and the trim component 100 is disposed within and forms a load floor for the cargo area 12 of the vehicle 10. While the trim component 100 is used in the cargo area 12 of a suitable vehicle, such as a van, truck, sport utility vehicle, and/or the like, it is to be appreciated that the trim component 100 can be used anywhere within the vehicle interior. It is further to be understood that the trim component 100 can be used in any type of vehicle, not limited to automobiles. For example, the trim component 100 could be used in airplanes, boats, trains, trailers, buses, etc.

Figure 2:
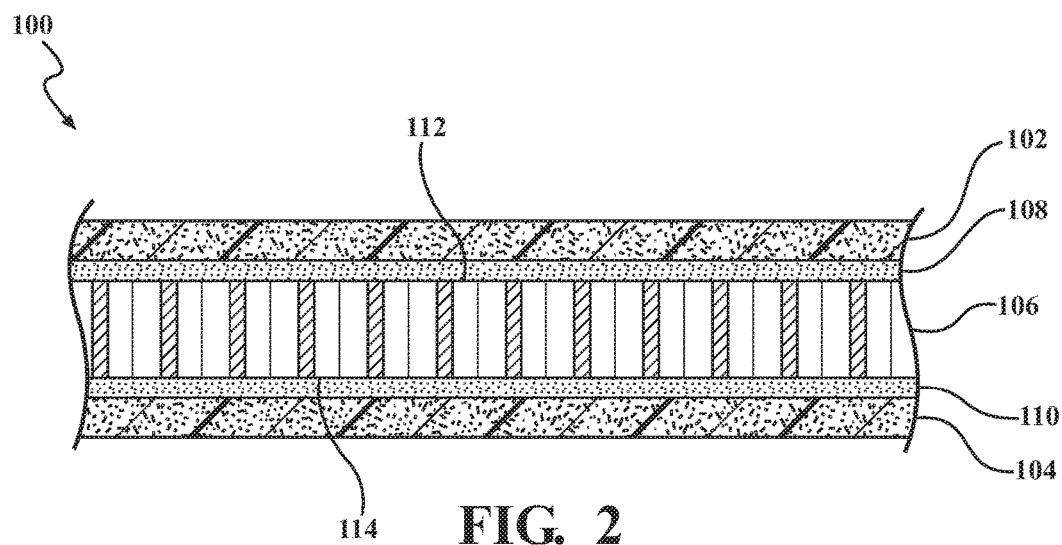
FIG. 2 is a schematic, cross-sectional view of the trim component taken along lines 2-2 in FIG. 1.
Figure 3:
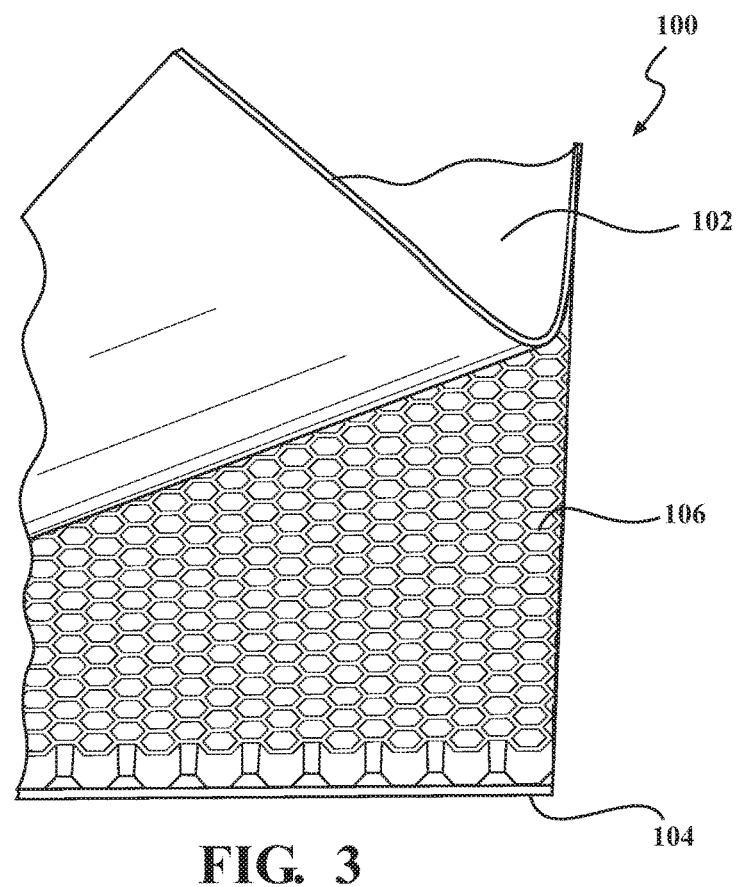
FIG. 3 is a perspective view of the trim component of FIG. 2, with one of the skin layers peeled back to expose the core layer.

An embodiment of the trim component 100 is described below with reference to FIGS. 2-4. The trim component 100 is a sandwich composite including a first skin layer 102, a second skin layer 104, and a core layer 106 sandwiched between the first 102 and second 104 skin layers. The trim component 100 further includes a first thermoplastic adhesive material 108 disposed between the first skin layer 102 and the core layer 106, and a second thermoplastic adhesive material 110 disposed between the second skin layer 104 and the core layer 106.

The first 102 and second 104 skin layers are generally lightweight, thin layers of material disposed on opposing first 112 and second 114 sides of the core layer 106. Each of the first 102 and second 104 skin layers is formed from a material chosen from glass, a glass fiber composite material, a carbon fiber-reinforced polymer, a thermoplastic polymer, a thermoset polymer, and combinations thereof. In one particular embodiment, each of the first 102 and second 104 skin layers are formed from a blend of glass fibers and a thermoplastic material, such as polypropylene. In another particular embodiment, each of the first 102 and second 104 skin layers are formed from glass fiber-reinforced polypropylene. Non-limiting examples of suitable materials for the first 102 and second 104 skin layers include SymaLITE®, a glass-reinforced thermoplastic composite material available from Quadrant Engineering Plastic Products, Inc. (Reading, Pa.) and SuperLite®, a thermoformable composite of plastic resin and long chopped fibers available from Hanwha Azdel Inc. (Forest, Va.). Typically, the first 102 and second 104 skin layers are formed from the same material, such as the glass fiber-reinforced polypropylene. Alternatively, the first 102 and second 104 skin layers could be formed from different materials or combinations of different materials.

In an embodiment, the weight of each of the first 102 and second 104 skin layers is from about 500 to about 2,000 gsm (grams per square meter). In another embodiment, the weight of each of the first 102 and second 104 skin layers is from about 500 to 1,200 gsm. It is to be appreciated that the weight of the first 102 and second 104 skin layers is typically based, at least in part, on load specifications of the vehicle 12. To this end, the weight of each of the first 102 and second 104 skin layers may be lower for smaller vehicles (such as a small sport utility vehicle) and may be higher for larger vehicles (such as a van). In another embodiment, the weight of the first skin layer 102 may be different from the weight of the second skin layer 104. In an example, the weight of the first skin layer 102 (which would be the top layer of the trim component 100) may be 25 to 30% less than the weight of the second skin layer 104 (which would be the bottom layer of the trim component 100). In another example, the weight of the first skin layer 102 (top layer) may be from 500 to 700 gsm, and the weight of the second skin layer 104 (bottom layer) may be from 900 to 1,200 gsm.

As previously mentioned, the core layer 106 is sandwiched between the first 102 and second 104 skin layers. More particularly, the core layer 106 has opposed first 114 and second 116 sides, and the first skin layer 102 is disposed on the first side 114 of the core layer 106 and the second skin layer 104 is disposed on the second side 116 of the core layer 106. The core layer 106 is a generally thick layer chosen from a suitable lightweight material having relative low strength such that the core layer 106 has low density and a high bending stiffness. As best shown in FIG. 3, the core layer 106 has a honeycomb structure. For example, the honeycomb structure may have an array of hollow cells formed between thin vertical material walls. The cells are typically columnar and hexagonal in configuration, however other configurations of the cells are also contemplated. In addition, the honeycomb structure is an unfilled honeycomb structure. Alternatively, the honeycomb structure could be filled; e.g., the columns of the honeycomb structure could be filled with one or more foams for added strength. In one embodiment, the core layer 106 has a paper-based honeycomb structure, having a paper weight of from 23 to 29 lbs/ft$^3$ (pounds per cubic feet), a thickness of about 1 to 4 mm, and a honeycomb cell diameter of from 6 to 12 mm (millimeters). In a non-limiting example, the core layer 106 is formed from an Axxor endless honeycomb core, a paper-based honeycomb structure available from Axxor BV (The Netherlands). Alternatively, the core layer 106 could have a honeycomb structure formed from open-cell-structured foams, closed-cell-structured foams, balsa wood, syntactic foams, metal, and/or combinations thereof.

The first thermoplastic adhesive material 108 is disposed between the first skin layer 102 and the first side 112 of the core layer 106, and the second thermoplastic adhesive material 110 is disposed between the second skin layer 104 and the second side 114 of the core layer 106. The first thermoplastic adhesive material 108 operates to form suitably strong adhesive bond between the first skin layer 102 and the core layer 106, and the second thermoplastic adhesive material 110 operates to form a suitably strong adhesive bond between the second skin layer 104 and the core layer 106. In an embodiment, the first 108 and second 110 adhesive materials are chosen from a thermoplastic adhesive material including a polyamide. It was found that the thermoplastic adhesive including the polyamide forms a suitably strong adhesive bond between the skin layer 102, 104 formed from a blend of glass fibers and polypropylene (such as glass fiber-reinforced polypropylene) and the core layer 106. A non-limiting example of a suitable adhesive material includes APT 9B9B, a thermoplastic adhesive material including a polyamide available from Advance Packaging Technologies (Waterford, Mich.).

In an embodiment, the thermoplastic adhesive materials 108, 110 are activated by applying heat. In an example, the thermoplastic adhesive material including the polyamide is activated when heated to a temperature of at least 290° F. (at least 143° C.). When activated, the thermoplastic adhesive material 108 forms an adhesive film between the first skin layer 102 and the core layer 106, which forms a suitable surface-area bond between the first skin layer 102 and the core layer 106. Similarly, when activated, the thermoplastic adhesive material 110 forms an adhesive film between the second skin layer 104 and the core layer 106, which forms a suitable surface-area bond between the second skin layer 104 and the core layer 106. In an embodiment, the film formed by each of the first 108 and second 110 adhesive materials has a weight of from 40 to 110 gsm.

The trim component 100 may be formed utilizing a molding/layering process. This process involves applying the first thermoplastic adhesive material 108 to the first side 112 of the core layer 106, and disposing a sheet of the first skin layer 102 over the first thermoplastic adhesive material 108 on the first side 112 of the core layer 106. The process further involves applying the second thermoplastic adhesive material 110 to the second side 114 of the core layer 106, and disposing a sheet of the second skin layer 104 over the second thermoplastic adhesive material 110 on the second side 114 of the core layer 106. The skin layer 102, the first adhesive material 108, the core layer 106, the second adhesive layer 110, and the second skin layer 104 are laminated together to form a sandwich composite. The composite is placed in an oven and heated at least to the activation temperature of the adhesive materials 108, 110. In an embodiment, the oven is heated to an activation temperature of at least 290° F. When activated, the adhesive material 108, 110 operates to form an adhesive surface-area bond between the skin layers 102, 104 and the core layer 106.

After heating, the composite is placed into a molding tool (operated at a lower temperature, such as at or near 60° F.) and the composite is molded into a desired configuration under pressure. During a compression stage of the molding process, the skin layers 102, 104 are pressed into the individual cores of the honeycomb structure of the core layer 106, and the underlying adhesive material 108, 110 causes additional bonding of the skin layers 102, 104 to the core layer 106 within the individual cores of the core layer 106. To this end, it has been found that a suitably strong bond between the skin layers 102, 104 and the core layer 106 can be formed with the specific of the materials selected for the skin layers 102, 104, the core layer 106, and the adhesive materials 108, 110. It has also been found that a superior bond between the skin layers 102, 104 and the core layer 106 can be formed during the compression stage of the molding process when the skin layers 102, 104 are pressed into the individual cores of the core layer 106.

Figure 4:
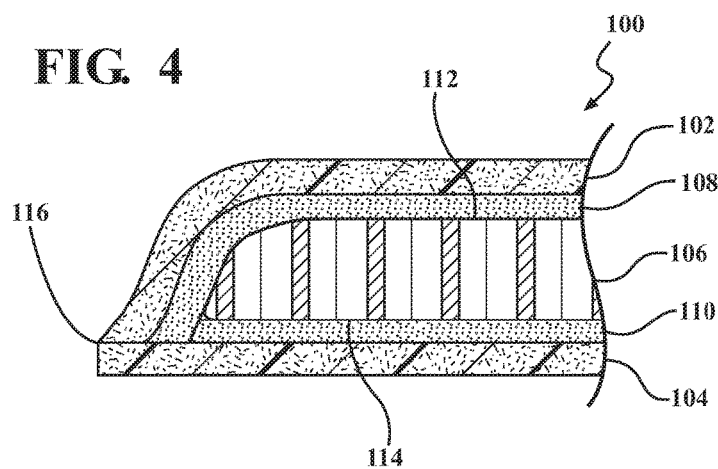
FIG. 4 is a schematic, cross-sectional view of a portion of the trim component with a periphery of the trim component pinched to form a seal.

In an embodiment, and as shown in FIG. 4, the periphery 116 of the trim component 100 may be pinched to form a seal. Pinching may be accomplished, for example, during the molding process described above. When pinched, the skin layer 102 (with the adhesive material 108), contacts the other skin layer 104 (with the adhesive 110) and forms a seal along the periphery 116 of the trim component 100. By forming a seal, the skin layers 102, 104 encapsulate the core layer 106 to protect the core layer 106, for example, from degradation.

Figure 5:
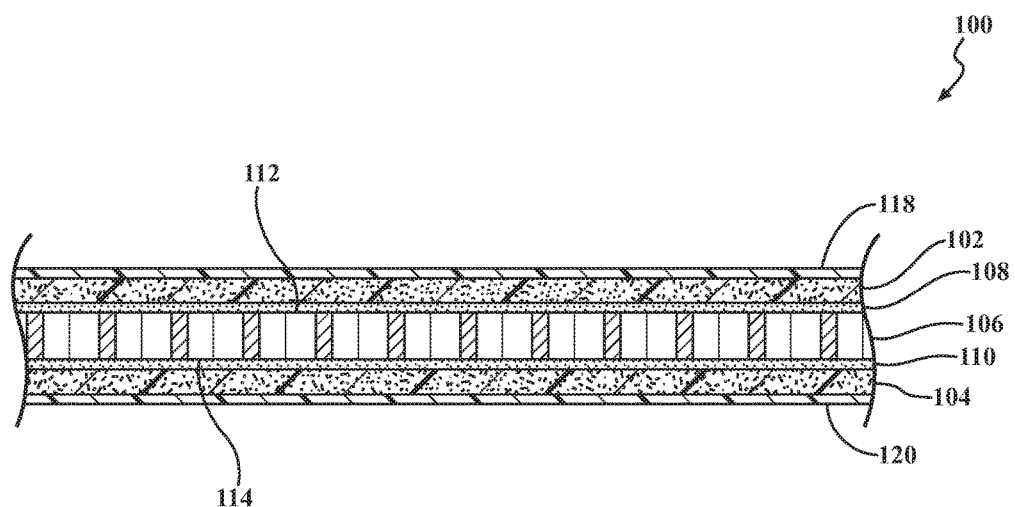
FIG. 5 is a schematic, cross-sectional view of another embodiment of the trim component.

In another embodiment, and as shown in FIG. 5, the trim component 100 may further include cover layers 118, 120 that may be used for decorative purposes. The cover layers 118, 120 may be disposed on and adhered to the skin layers 102, 104, respectively, utilizing a suitable adhesive (not illustrated in the drawings), non-limiting examples of which include heat-activated polypropylene adhesives or other thermoplastic perforated or solid film adhesives.

The embodiments and examples of the trim component 100 described in detail above is desirably lightweight and has a suitable stiffness for resistance to deflection and to satisfy load bearing requirements. Additionally, the trim component is desirably strong due, at least in part, to the strong and superior bond formed between the skin layers 102, 104 and the core layer 106. As mentioned above, the strong and superior bond is formed by the specific combination of materials of the skin layers 102, 104 (namely, a glass fiber-reinforced polypropylene), a paper-based honeycomb core layer 106, and the thermoplastic adhesive material 108, 110 including a polyamide. The strong and superior bond may also be formed by the specific combination of materials of the skin layers 102, 104, the core layer 106, and the adhesive materials 108, 110, in combination with compression of the layers 102, 104, 106 during the molding process.

The trim component 100 of the present disclosure is further illustrated in the Examples set forth below. It is to be understood that the Examples are provided for illustrative purposes and are not to be construed as limiting the scope of the present disclosure.

EXAMPLES

Three composite samples were prepared, and each of the samples were tested for bond strength utilizing the ASTM C297-15 test method. The first sample is identified by PA-A, which is a sandwich composite including a paper-based honeycomb core sandwiched between Azdel SuperLite® skin layers utilizing APT 9B9B, which is a thermoplastic adhesive material including a polyamide. The second sample is identified by PA-Q, which is a sandwich composite including a paper-based honeycomb core sandwiched between Quadrant SymaLITE® skin layers utilizing the APT 9B9B adhesive. The third sample is identified by PP-A, which is a sandwich composite including a paper-based honeycomb core sandwiched between Azdel SuperLite® skin layers utilizing an adhesive material including polypropylene.

The three samples were tested for bond strength utilizing the ASTM C297-15 test method (2015). In particular, this test method is designed to determine the flatwise tensile strength of the core, the core-to-facing bond, or the facing of an assembled sandwich panel. Utilizing a testing machine, the test method consists of subjecting the sandwich composite samples to a uniaxial tensile force normal to the plane of the sample. The force is transmitted to the sandwich composite sample through thick loading blocks, which are bonded to the sandwich composite facings (or skin layers) or directly to the core.

Three specimens of each sample were tested, and a maximum load (N) was determined for each of the specimens at the point when breakage occurred in the adhesive layer at the skin-core layer interface. The maximum load for each of the specimens for each sample tested is set forth in Tables 1-3 below.

TABLE 1

Bond Strength Test Results for Sample PA-A

| Specimen | Maximum Load (N) | Break Mode |
|---|---|---|
| 1 | 1153 | Adhesion of Core-Facing Adhesive |
| 2 | 1142 | Adhesion of Core-Facing Adhesive |
| 3 | 1153 | Adhesion of Core-Facing Adhesive |
| Mean | 1149 | |

TABLE 2

Bond Strength Test Results for Sample PA-Q

| Specimen | Maximum Load (N) | Break Mode |
|---|---|---|
| 1 | 1114 | Adhesion of Core-Facing Adhesive |
| 2 | 1087 | Adhesion of Core-Facing Adhesive |
| 3 | 1336 | Adhesion of Core-Facing Adhesive |
| Mean | 1179 | |

TABLE 3

Bond Strength Test Results for Sample PP-A

| Specimen | Maximum Load (N) | Break Mode |
|---|---|---|
| 1 | 90 | Adhesion of Core-Facing Adhesive |
| 2 | 104 | Adhesion of Core-Facing Adhesive |
| 3 | 60 | Adhesion of Core-Facing Adhesive |
| Mean | 85 | |

As shown in Tables 1-3 above, the sandwich composite samples utilizing the thermoplastic adhesive material with a polyamide could withstand much higher loads (N) compared to the sandwich composite sample utilizing the adhesive material including polypropylene. These results indicate superior bond strength between the skin layers and the core layer of the composite samples utilizing the thermoplastic adhesive material including the polyamide, compared to the composite sample utilizing the adhesive material including polypropylene.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A trim component for a vehicle interior, said trim component comprising:
   a first skin layer;
   a second skin layer;
   a core layer sandwiched between said first and second skin layers with said core layer having first and second sides;
   a first thermoplastic adhesive material including a polyamide disposed between said first skin layer and said core layer to adhere said first skin layer to said first side of said core layer; and
   a second thermoplastic adhesive material including a polyamide disposed between said second skin layer and said core layer to adhere said second skin layer to said second side of said core layer, wherein a weight of said first skin layer is from 20 to 30% less than a weight of said second skin layer.

2. The trim component as set forth in claim 1 wherein said first thermoplastic adhesive material forms a film between said first skin layer and said first side of said core layer and bonds said first skin layer to said core layer, and said second thermoplastic adhesive material forms a film between said second skin layer and said second side of said core layer and bonds said second skin layer to said core layer.

3. The trim component as set forth in claim 1 wherein said film of each of said first and second thermoplastic adhesive materials has a weight of from about 40 to 110 gsm.

4. The trim component as set forth in claim 1 wherein each of said first and second skin layers is formed from a material chosen from glass, a glass fiber composite material, a carbon fiber-reinforced polymer, a thermoplastic polymer, and combinations thereof.

5. The trim component as set forth in claim 1 wherein each of said first and second skin layers is formed from glass fiber-reinforced polypropylene.

6. The trim component as set forth in claim 1 wherein each of said first and second skin layers has a weight of from 500 to 2,000 gsm.

7. The trim component as set forth in claim 1 wherein said core layer has a honeycomb structure.

8. The trim component as set forth in claim 1 wherein said core layer has a paper-based honeycomb structure having a paper weight of from 23 to 29 lbs/ft$^3$.

9. The trim component as set forth in claim 1 wherein said core layer has a honeycomb structure with a honeycomb cell diameter of from 6 to 12 mm.

10. The trim component as set forth in claim 1 wherein said trim component has a periphery and said trim component is pinched along said periphery so that said first skin layer contacts said second skin layer and encapsulates said core layer.

11. The trim component as set forth in claim 1 further comprising a first cover layer disposed on said first skin layer and a second cover layer disposed on said second skin layer, with said first and second cover layers forming first and second decorative surfaces of said trim component.

12. A trim component for a vehicle interior, said trim component comprising:
a first skin layer formed from a blend of glass fibers and a thermoplastic material;
a second skin layer formed from a blend of glass fibers and a thermoplastic material;
a core layer sandwiched between said first and second skin layers with said core layer having a honeycomb structure with first and second sides;
a first thermoplastic adhesive material including a polyamide disposed between said first skin layer and said core layer to adhere said first skin layer to said first side of said core layer; and
a second thermoplastic adhesive material including a polyamide disposed between said second skin layer and said core layer to adhere said second skin layer to said second side of said core layer, wherein a weight of said first skin layer is from 20 to 30% less than a weight of said second skin layer.

13. The trim component as set forth in claim 12 wherein said first thermoplastic adhesive material forms a film between said first skin layer and said first side of said core layer and bonds said first skin layer to said core layer, and said second thermoplastic adhesive material forms a film between said second skin layer and said second side of said core layer and bonds said second skin layer to said core layer.

14. The trim component as set forth in claim 12 wherein said film of each of said first and second thermoplastic adhesive materials has a weight of from about 40 to 110 gsm.

15. The trim component as set forth in claim 12 wherein said first skin layer is further defined as being formed from a blend of glass fibers and polypropylene, and said second skin layer is further defined as being formed from a blend of glass fibers and polypropylene.

16. The trim component as set forth in claim 12 wherein each of said first and second skin layers has a weight of from 500 to 2,000 gsm.

17. The trim component as set forth in claim 12 wherein a weight of said first skin layer is less than a weight of said second skin layer.

18. The trim component as set forth in claim 12 wherein said core layer is further defined as having a paper-based honeycomb structure having a paper weight of from 23 to 29 lbs/ft$^3$.

19. A load bearing trim component for a vehicle interior, said trim component comprising:
a first skin layer;
a second skin layer;
a core layer sandwiched between said first and second skin layers with said core layer having first and second sides;
a first thermoplastic adhesive material including a polyamide disposed between said first skin layer and said core layer to adhere said first skin layer to said first side of said core layer; and
a second thermoplastic adhesive material including a polyamide disposed between said second skin layer and said core layer to adhere said second skin layer to said second side of said core layer, wherein a weight of said first skin layer is from 20 to 30% less than a weight of said second skin layer.

* * * * *